United States Patent [19]
Weiland et al.

[11] Patent Number: 5,590,408
[45] Date of Patent: Dec. 31, 1996

[54] REVERSE LINK, TRANSMIT POWER CORRECTION AND LIMITATION IN A RADIOTELEPHONE SYSTEM

[75] Inventors: Ana L. Weiland, Encinitas; Richard K. Kornfeld; John E. Maloney, both of San Diego, all of Calif.

[73] Assignee: QUALCOMM Incorporated, San Diego, Calif.

[21] Appl. No.: 407,543

[22] Filed: Mar. 20, 1995

Related U.S. Application Data

[62] Division of Ser. No. 203,151, Feb. 28, 1994, Pat. No. 5,452,473.

[51] Int. Cl.$^6$ ................................................ H04B 1/04
[52] U.S. Cl. .......................... 455/69; 455/115; 455/116; 455/126
[58] Field of Search ........................... 455/33.1, 69, 126, 455/127, 115, 117, 116; 330/129, 132, 136; 375/200, 205, 296, 297; 370/95.3

[56] References Cited

U.S. PATENT DOCUMENTS

| | | | |
|---|---|---|---|
| 4,285,065 | 8/1981 | Priniski | 455/177.1 |
| 4,870,698 | 9/1989 | Katsuyama et al. | 455/117 |
| 4,882,767 | 11/1989 | Machida et al. | 455/117 |
| 4,939,786 | 7/1990 | MaCallum et al. | 455/117 |
| 5,056,109 | 10/1991 | Gilhousen | 455/69 |
| 5,196,808 | 3/1993 | Pickett et al. | 455/117 |
| 5,199,045 | 3/1993 | Kato | 455/88 |
| 5,267,262 | 11/1993 | Wheatley, III | 455/69 |
| 5,278,994 | 1/1994 | Black et al. | 455/126 |
| 5,297,161 | 3/1994 | Ling | 455/69 |
| 5,307,512 | 4/1994 | Mitzlaff | 455/126 |
| 5,337,006 | 8/1994 | Miyazaki | 455/126 |
| 5,381,115 | 1/1995 | Timmons et al. | 455/126 |
| 5,448,770 | 9/1995 | Hietala et al. | 455/126 |

OTHER PUBLICATIONS

"CDMA Network Engineering Handbook", Nov. 23, 1993, pp. 8-1 –8-8.

*Primary Examiner*—Andrew Faile
*Attorney, Agent, or Firm*—Russell B. Miller; Roger W. Martin

[57] ABSTRACT

The process and apparatus of the present invention limits the output power of a radiotelephone, operating in a cellular system in the preferred embodiment. This ensures the transmitted sidebands and synthesizer phase noise remains within a certain specification. This is accomplished by power detection and a correction accumulator that together generate a gain control signal by limiting the gain adjustment to a maximum value, even when the cell site communicating with the radiotelephone is sending power turn-up commands to the radiotelephone. This process includes dynamically correcting the output level of the transmitter due to gain variations in the transmitter stages or gain control elements.

7 Claims, 9 Drawing Sheets

REVERSE LINK, TRANSMIT POWER CORRECTION AND LIMITATION IN A RADIOTELEPHONE SYSTEM

This is a Divisional of application Ser. No. 08/203,151, filed Feb. 28, 1994, U.S. Pat. No. 5,452,473.

BACKGROUND OF THE INVENTION

I. Field of the Invention

The present invention relates to radio communications. More particularly, the present invention relates to power control in a radio-telephone system.

II. Description of the Related Art

The Federal Communications Commission (FCC) governs the use of the radio frequency (RF) spectrum. The FCC allocates certain band-widths within the RF spectrum for specific uses. A user of an allocated bandwidth of the RF spectrum must take measures to ensure that the radiated emissions inside and outside of that bandwidth are maintained within acceptable levels to avoid interfering with other users operating in the same and or other bandwidths. These levels are governed by both the FCC and the particular user-groups of said bandwidth.

The 800 MHz cellular telephone system operates its forward link, the cell to radiotelephone transmission, in the bandwidth of 869.01 MHz to 893.97 MHz and the reverse link, the radiotelephone to cell transmission, in the bandwidth of 824.01 MHz to 848.97 MHz. The forward and reverse link bandwidths are split up into channels each of which occupies a 30 kHz bandwidth. A particular user of the cellular system may operate on one or several of these channels at a time. All users of the system must ensure that they are compliant with the level of radiated emissions allowable inside and outside of the channel or channels that they have been assigned.

There are several different techniques of modulation that can be used in the cellular telephone system. Two examples of modulation techniques are frequency division multiple access (FDMA) and code division multiple access (CDMA).

The FDMA modulation technique generates signals that occupy one channel at a time while the CDMA modulation technique generates signals that occupy several channels. Both of these techniques must control their return link radiated emissions to within acceptable limits inside and outside of the assigned channel or channels. For maximum system performance, users of the CDMA technique must carefully control the level of radiated power inside the channels in which they are operating.

FIG. 1 shows a typical cellular radiotelephone. In both an FDMA and a CDMA based radiotelephone, there exists the possibility of driving the power amplifier (101) in the transmitter beyond a point where acceptable out of channel radiated emissions are maintained. This is primarily due to the increased distortion output levels of the power amplifier (101) at high output powers. Also, driving the power amplifier (101) beyond a certain point can cause interference internal to the radio. For example, PA puncturing in CDMA affects synthesizer phase noise due to large current transitions. Both of these issues cause unacceptable radio performance.

Maintaining the proper on-channel output power can be difficult due to several undesirable effects in the radiotelephone hardware. For example, the CDMA based radio must implement a power control system that operates over a very wide dynamic range, 80dB to 90dB, such that the transmitted output power is linearly related to the received input power.

Closed loop and open loop power control together determine the return link transmit energy, as disclosed in U.S. Pat. No. 5,056,109 to Gilhousen et al. and assigned to Qualcomm, Incorporated. Therefore, the linear and nonlinear errors produced in both the receiver (103) and transmitter (102) RF sections can cause unacceptable power control performance. Also, both the FDMA and CDMA based radios must operate on different channels while maintaining acceptable output power levels. Variation in output power level and input power detection versus frequency can cause an unacceptable amount of error in the amount of return link transmitted energy.

These issues present significant problems to the designer of both FDMA and CDMA based radiotelephones. There is a resulting need for an effective, cost efficient means of correcting these problems.

SUMMARY OF THE INVENTION

The process of the present invention enables a radiotelephone to operate in a linear fashion over a wide dynamic range while maintaining acceptable transmit output power levels inside and outside of the return link bandwidth. The forward and return link power are measured by power detectors and input to an analog to digital converter accessible by both control hardware and/or software. The closed loop power control setting is also monitored. The radiotelephone uses the detected power levels and closed loop power control setting to index a set of correction tables that indicate the reverse link transmit power error and desired power amplifier biasing for the particular operating point. The radiotelephone also determines if the transmitter is operating above a maximum set point. The transmit gain and power amplifier biasing of the radiotelephone are adjusted to correct the undesired error and maintain the desired output power.

DETAILED DESCRIPTION OF THE PREFERRED EMBODIMENT

The process of the present invention provides power control correction for a mobile radiotelephone as well as maintaining acceptable in and out of band maximum emission levels. This is accomplished by real-time compensation utilizing a set of correction tables that are generated during the production testing of each radiotelephone.

Figure 1:
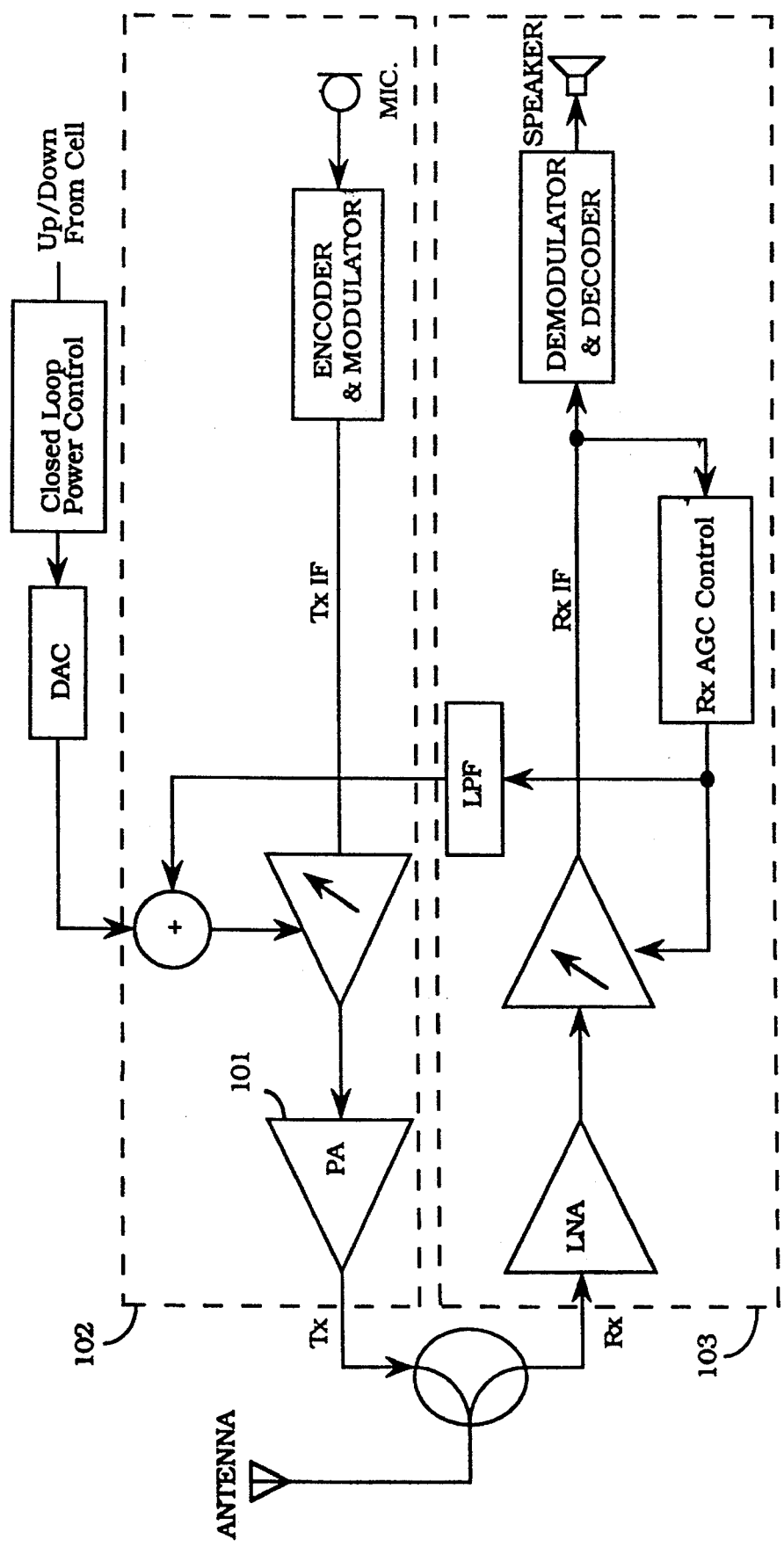
FIG. 1 shows a block diagram of a typical prior art radiotelephone frequency section for use in a radiotelephone system.
Figure 2:
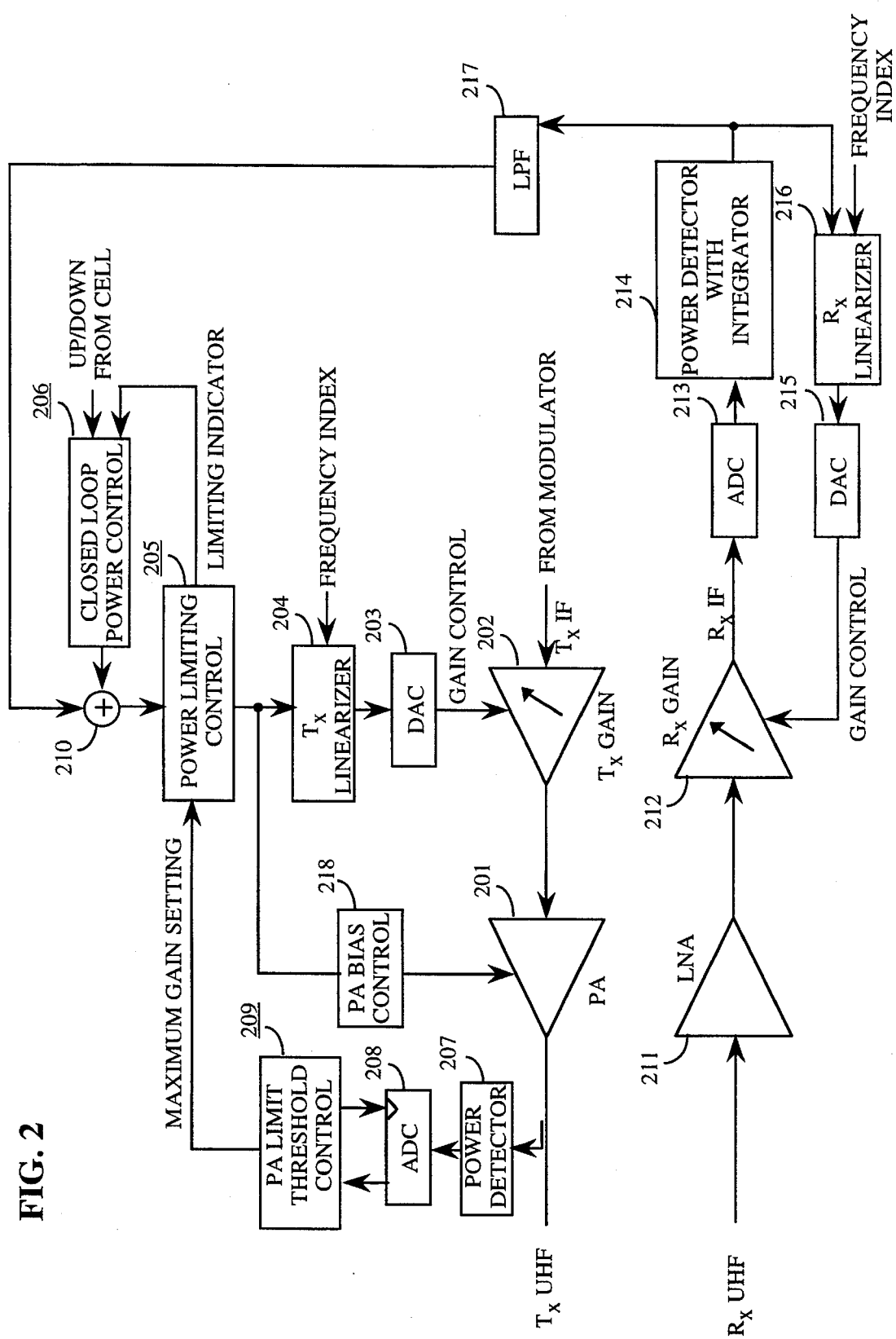
FIG. 2 shows a block diagram of the preferred embodiment power control correction implementation.
Figure 3:
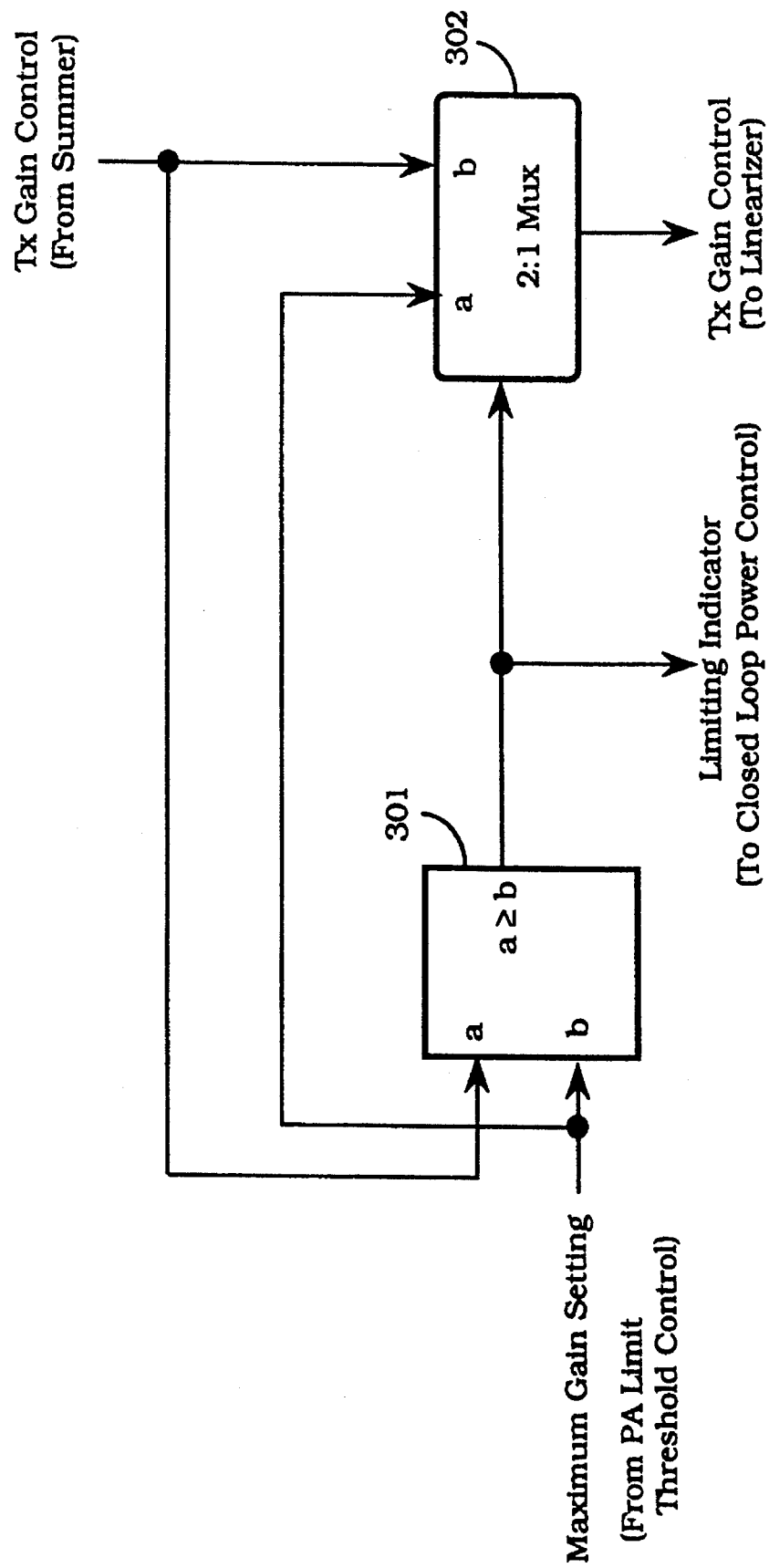
FIG. 3 shows a block diagram of the power limiting control section as related to FIG. 2.
Figure 4:
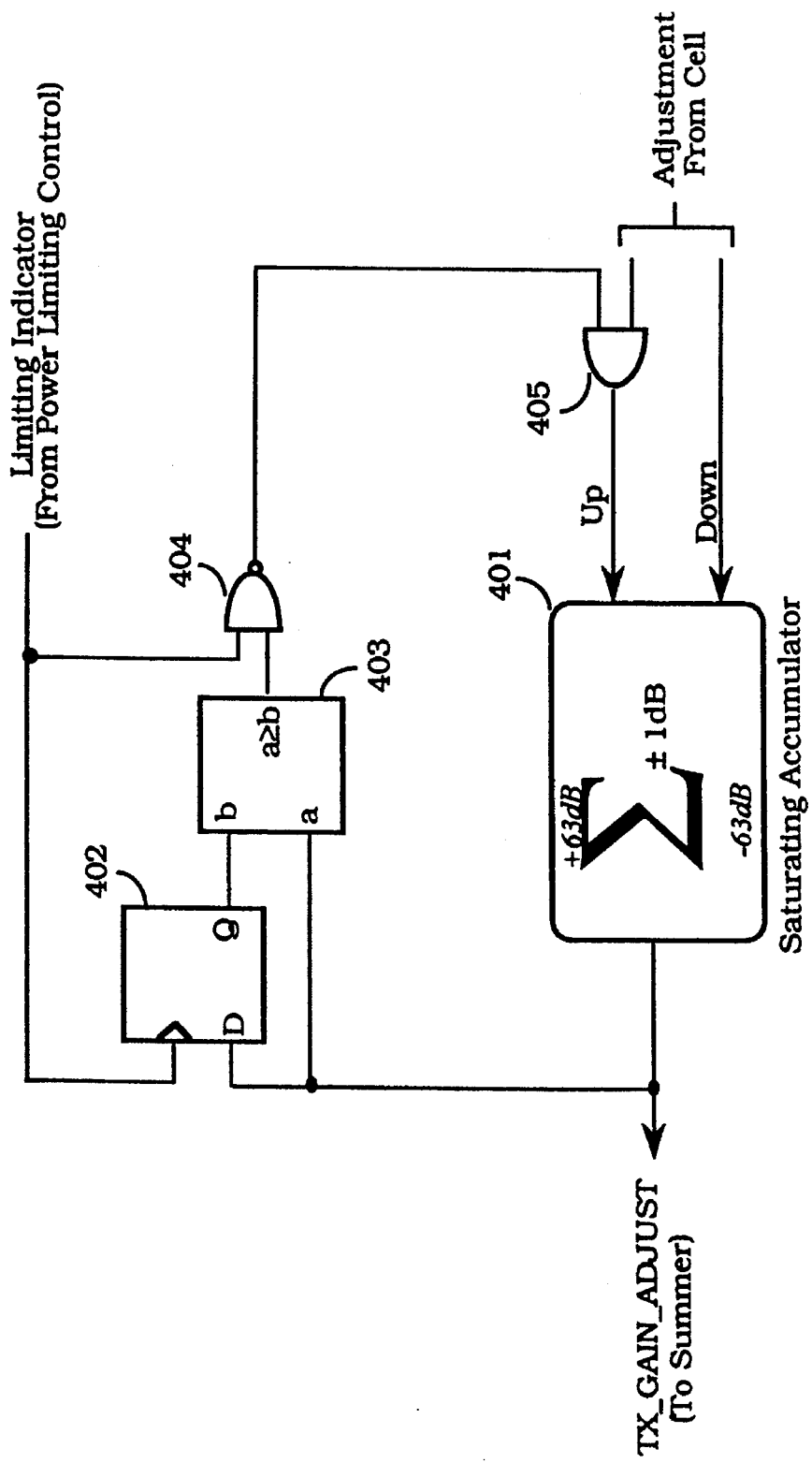
FIG. 4 shows a block diagram of the closed loop power control section as related to FIG. 2.
Figure 5:
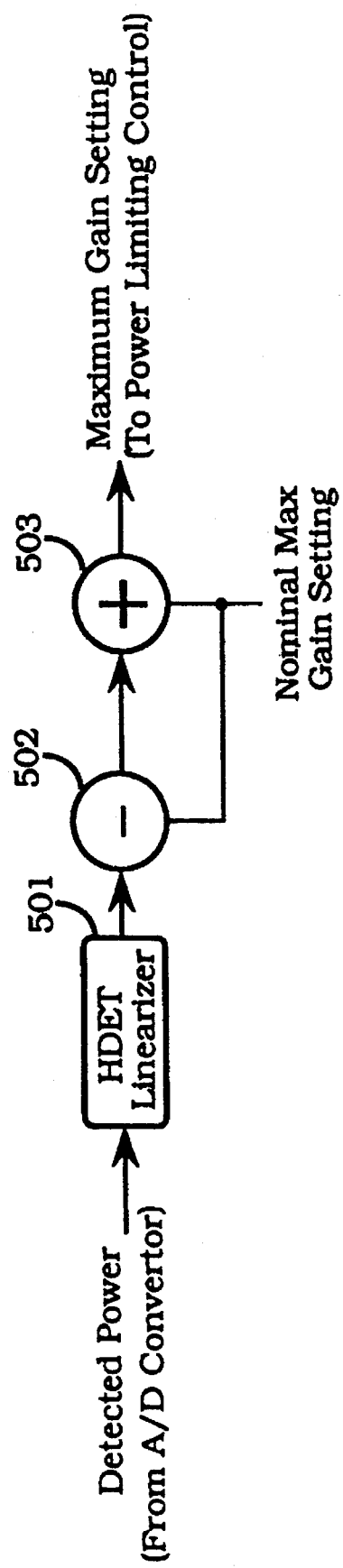
FIG. 5 shows a block diagram of the PA limit threshold control section as related to FIG. 2.

FIG. 2 shows a block diagram of a CDMA radiotelephone with the preferred embodiment power control correction implementation. FIGS. 3, 4, and 5 detail specific blocks of FIG. 2. The radiotelephone is comprised of a receive linearization section, transmit linearization section, power amplifier bias control section, and power limiting control section.

The receive linearization section includes an automatic gain control (AGC) section. The signal input to the AGC section is received on the forward link and amplified by a low noise amplifier (LNA) (211). The output of the LNA (211) is input to a variable gain amplifier (212). The variable gain amplifier (212) produces a signal that is converted to a digital signal using an analog to digital converter (ADC) (213).

The power of the digitized received signal is next computed by a digital power detector (214). The power detector (214) includes an integrator that integrates the detected power with respect to a reference voltage. In the preferred embodiment, this reference voltage is provided by the radio's demodulator to indicate the nominal value at which the demodulator requires the loop to lock in order to hold the power level constant. The demodulator requires this value for optimum performance since a power level too far out of the optimum range will degrade the performance of the demodulator. The power detector (214) performs the integration, thus generating an AGC setpoint. The setpoint and a receive frequency index are input to a receiver linearizing table (216).

The AGC setpoint and the frequency index are used to address the linearizer (216), thus accessing the proper calibration value. This calibration value is then output to a digital to analog converter (215) that generates the analog representation of the receive AGC setting.

The analog value adjusts the biasing of the variable gain amplifier (212). The control of the variable gain amplifier (212) forces the receive AGC loop to close such that the input to the receiver linearizing table (216) follows a predetermined straight line with respect to RF input power. This linearization removes the undesired linear and non-linear errors in addition to variations versus frequency that would otherwise be apparent at the input to the receiver linearizing table (216) in the receiver. These errors and variations would contribute to errors in the transmitter.

In order to reduce the error in the receive and transmit chains versus frequency, the receive and transmit linearizers utilize the frequency index that specifies the current center frequency on which the receive and transmit chains are operating. During factory calibration of the radiotelephone, the linearizers are loaded with values, in addition to the previously mentioned calibration values, that are indexed by frequency to correct the errors related to operating center frequency.

The AGC setpoint is the open loop power control signal for the radio. In the preferred embodiment, this is the power control performed by the radio by itself without control input from the cells. As the power of the signal received from the cell increases, the radio decreases its transmit power. This output power control is accomplished by the AGC setpoint that is filtered by a low pass filter (217).

The transmit section includes a digital summer (210) that combines the AGC setpoint and a closed loop power control setting (206). The output of the summer (210) is fed into a power control limiting section (205). The operation of the power control limiting section (205) and the closed loop power control section (206), illustrated in FIGS. 3 and 4 respectively, will be discussed subsequently in greater detail.

The output of the power control limiting section (205), along with the transmit frequency index, are used to address values stored in a transmitter linearizing table (204). The transmitter linearizing table (204) contains values determined from production testing of the radiotelephone. The selected value is input to a digital to analog converter (203) whose output, an analog representation of the digital value input, controls a variable gain amplifier (202).

The biasing of the variable gain amplifier (202) is adjusted by the analog calibration value to a point such that the input to the transmitter linearizing table (204) follows a predetermined straight line with respect to transmitted RF output power. This linearization removes the undesired linear and non-linear errors along with variations versus frequency in the transmitter. This, combined with the previously mentioned receive linearization, greatly reduces the open and closed loop power control errors due to RF performance imperfections.

The power amplifier (PA) bias control section (218) controls the bias point of the transmit PA (201) based on the transmit gain setting such that the transmit sidebands for the given gain setting are optimized versus PA (201) current consumption. This allows a battery powered telephone to maximize talk time by reducing PA (201) current consumption at lower output powers while still maintaining acceptable sideband levels at higher output power levels.

The power control limiting section (205) is illustrated in FIG. 3. The power control limiting section (205) controls the closed loop power control and transmit gain settings when the output of the transmit gain summer (210) corresponds to a transmit output power level which is equal to or greater than the intended maximum output power. The maximum gain setting is determined by the PA limit threshold control section (209).

The threshold control section (209) determines the maximum gain setting based on a nominal value that is modified by a real-time measurement of the transmitted output power. The measurement is accomplished by an analog power detector (207) whose output transformed into a digital signal by an analog to digital converter (208). The digitized power value is then input to the threshold control section (209).

The threshold control section, detailed in FIG. 5, operates by the high power detector (HDET) linearizer (501) scaling the input digitized power value in order to match the numerology of the digital transmit gain control section. The scaled output from the linearizer (501) is subtracted (502) from the nominal maximum gain setting. This maximum gain setting can be hard coded into the radio during assembly or input during manufacturing and testing of the radio.

The difference of the maximum gain setting and the scaled output power is then added, by the adder (503) to the maximum gain setting. The sum of these signals is then used as the corrected maximum gain setting. This real-time modification of the detected power helps mitigate the errors introduced by temperature variations and aging of the transmitter PAs. In other words, if the difference between the maximum gain setting and the real-time measured power value is 0, then no correction is necessary. If there is a difference between the two, the difference is used to correct the maximum gain setting.

Referring to FIG. 3, a digital comparator (301) detects when the output of the transmit gain summer (210) equals or exceeds the maximum gain setting. The comparator (301) controls a 2:1 multiplexer (302) that outputs the maximum allowable setting when the output of the summer (210) exceeds the ms,mum allowable setting. When the output of the summer (210) is less than the maximum allowable setting, the multiplexer (302) outputs the direct output of the summer (210). This prohibits the transmitter from exceeding its maximum operating point.

The closed loop power control section (206), illustrated in FIG. 4, accumulates the power control commands sent on the forward link by the controlling radiotelephone cell site and outputs a gain adjust signal. The power control commands are collected in an accumulator (401). The operation of the accumulator (401) is controlled by the power control limiting section (205) when the transmit power amplifier (201) is outputting the maximum allowable power.

When the output of the summer (210) changes from being less than to equal or greater than the maximum allowable setting, the output of the closed loop power control accumulator (401) is latched into a flip-flop (402). While the output of the summer (210) is equal to or greater than the maximum allowable setting, as determined by the comparator (403) and NAND gate (404), an AND gate (405) masks off any closed loop power control up commands that would force the accumulator (401) above the flip-flop's (402) latched value. This prevents the accumulator from saturating during power limiting yet allows the closed loop power control setting to change anywhere below the latched value.

Figure 6:
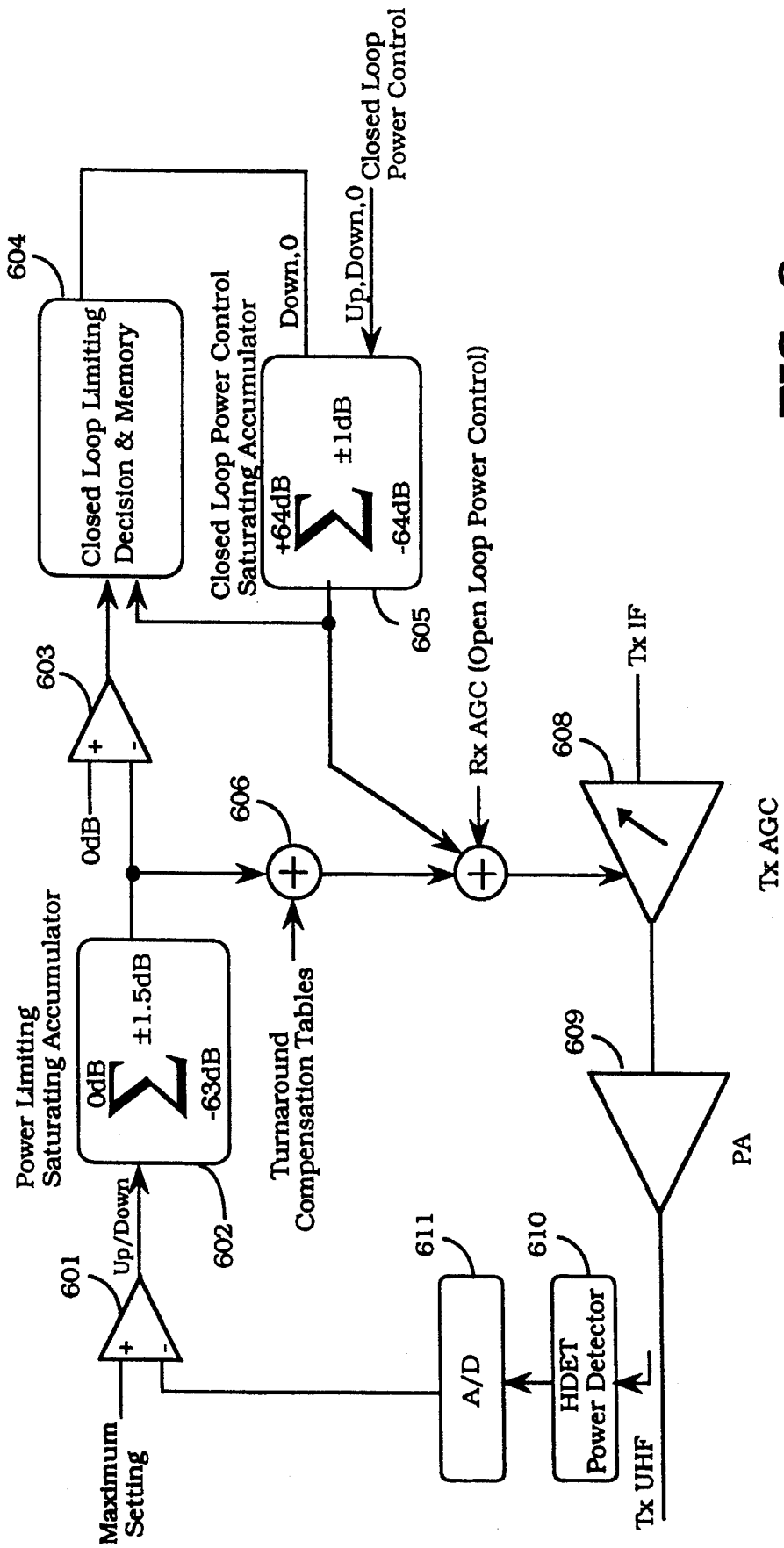
FIG. 6 shows an alternate embodiment of the present invention that employs a power limiting control system based on accumulator feedback control.

An alternate embodiment of the process of the present invention is illustrated in FIG. 6. In this embodiment, a power limiting control system is employed based on accumulator feedback control. The system operates by first measuring the output power of the power amplifier (609) using a power detector (610). The detected power is then digitized by an ADC (611) and compared to a maximum allowable setting by the comparator (601). If the output power is greater than the maximum setting, the power limiting accumulator (602) begins turning power down by reducing the gain of the variable gain amplifier (608). If the output power is less than the maximum setting the power limiting accumulator (602) returns to a 0dB correction value.

In this embodiment, a dosed loop power control limiting function(604 and 60), similar to the preferred embodiment, is employed. However, the trigger for the closed loop power control limiting function is a comparator (603) that detects when the power limiting accumulator (602) is limiting the output power by comparing the accumulator (602) output to 0dB with the comparator (603). The linearizing compensation tables, similar to the tables in the preferred embodiment, are added into the transmit gain control using a summer (606).

Figure 7:
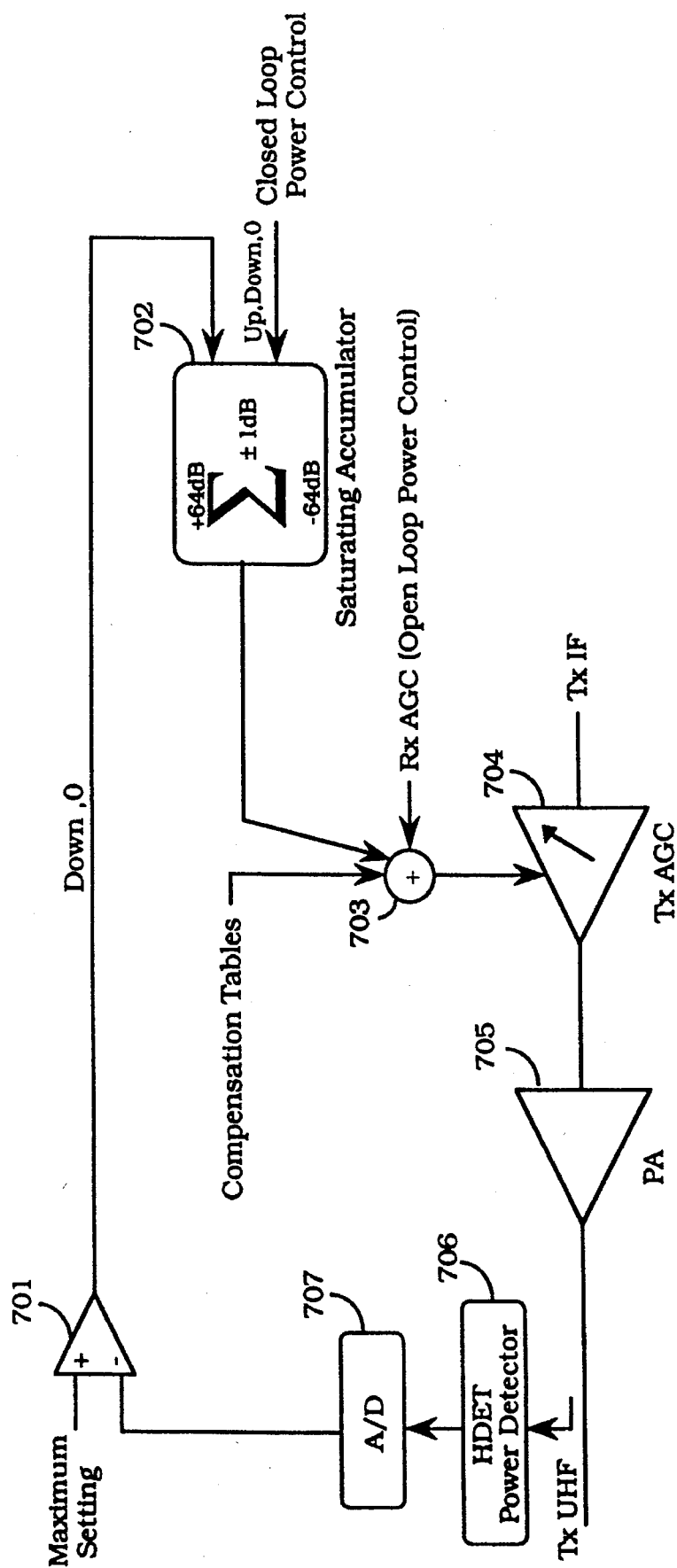
FIG. 7 shows an alternate embodiment of the present invention that employs a power limiting control system based on the dosed loop power control accumulator.

In another alternate embodiment, illustrated in FIG. 7, a power limiting control system is employed that is based on the closed loop power control accumulator (702). The system operates by first measuring the output power of the power amplifier (705) using a power detector (706). The detected power is digitized (707) and compared to a maximum allowable setting by the comparator (701). If the output power is greater than the maximum setting, the closed loop power control accumulator (702) is modified to turn the amplifier (704) power down by one step each 1.25 ms until the output power is less than the maximum setting. If the output power is less than the maximum setting, the closed loop power control accumulator is not modified. The linearizing compensation tables, similar to the preferred embodiment, are added into the transmit gain control using a summer (703).

Figure 8:
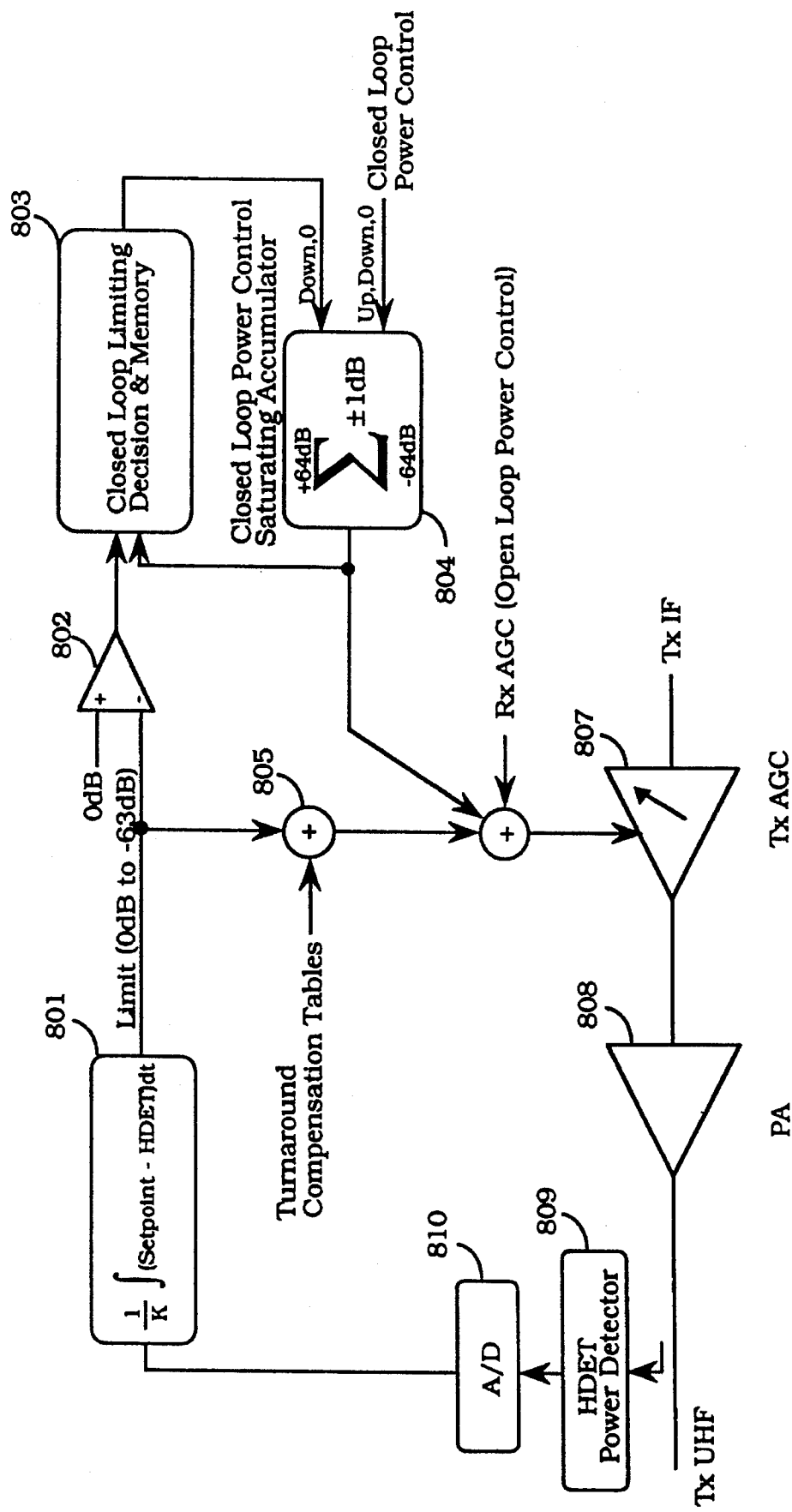
FIG. 8 shows an alternate embodiment of the present invention that employs a power limiting control system based on integral feedback control.

In yet another embodiment, illustrated in FIG. 8, a power limiting control system is employed that is based on integral feedback control. The system operates by first measuring the output power of the power amplifier (808) using a power detector (809). The detected power is digitized (810) and input to an integrator (801) that follows the equation:

$$\frac{1}{K} \cdot \int (\text{Setpoint} - \text{Detected}) dt.$$

The integrator (801), generating a gain control signal, saturates at 0 dB and −63 dB of correction. The gain control signal is thus limited within a range. If the output power is greater than the setpoint, the integrator turns down the output power of the amplifier (807) at a rate based on the integration constant K until the setpoint is reached. The integrator is allowed to turn power down by as much as 63 dB. If the output power is less than the setpoint, the output of the integrator (801) will be forced to zero, thus not adjusting output power.

In this embodiment, a closed loop power control limiting function (803 and 804), similar to the preferred embodiment, is employed. The trigger for the closed loop power control limiting function, however, is a comparator (802) that detects when the power limiting integrator (801) is limiting the output power. The linearizing compensation tables, similar to the preferred embodiment, are added into the transmit gain control using a summer (805).

Figure 9:
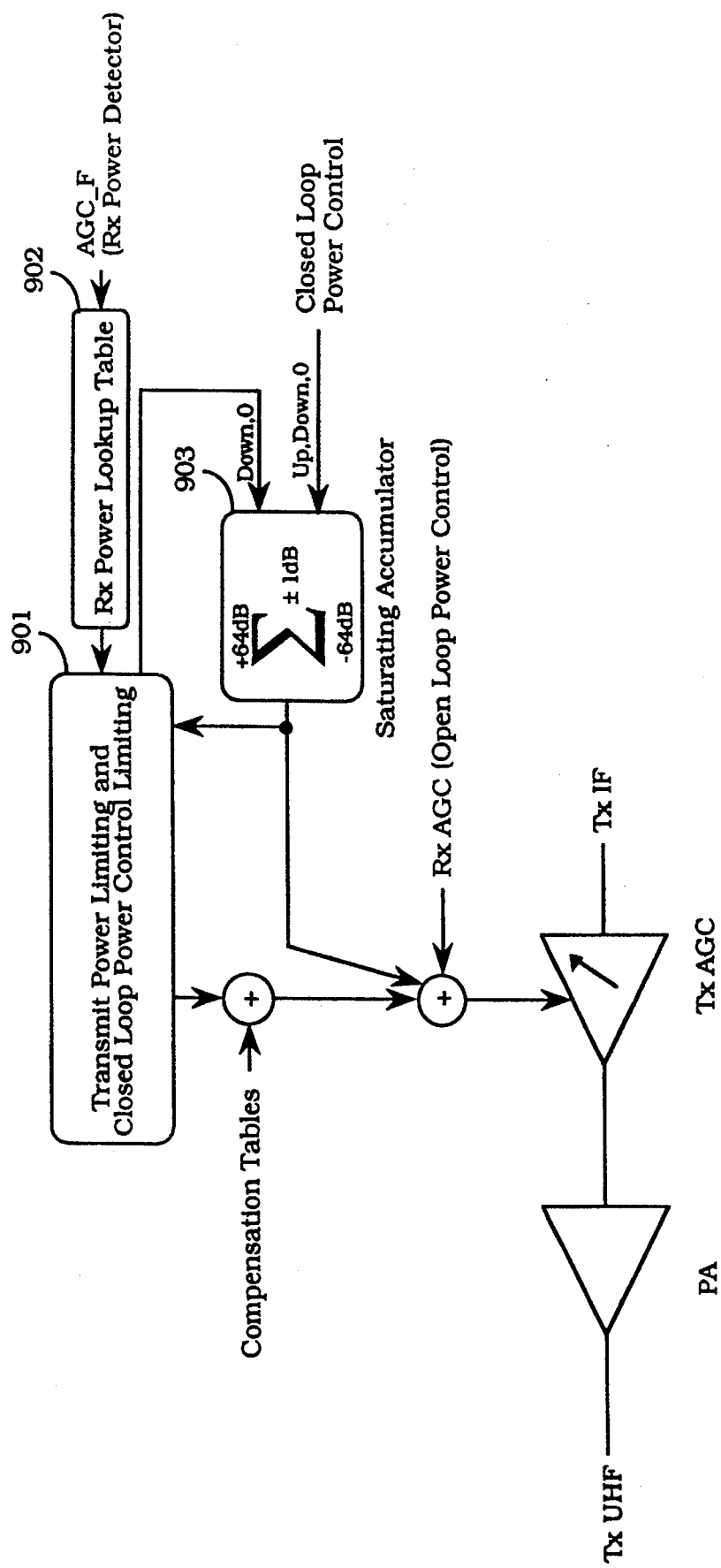
FIG. 9 shows an alternate embodiment of the present invention that employs a power limiting control system based on a measure of receive power and the closed loop power control setting to estimate output power.

In still another embodiment, illustrated in FIG. 9, a power limiting control system is employed that is based only on a measure of receive power as determined by the Rx power lookup table (902), and the closed loop power control setting as opposed to actual output power. The transmit power limiting and closed loop power control limiting function (901) can be implemented with either the preferred embodiment using the saturating accumulator (903), or one of the alternate embodiments. However, only the receive power and closed loop power control setting are used to estimate transmit output power.

In summary, the process of the present invention ensures that the transmitted sidebands and synthesizer phase noise of a radio transmitter remains within a predetermined specification by limiting the maximum output power. This power limitation is accomplished by a control loop including a calibration look-up table. Therefore, a radiotelephone using the process of the present invention would not exceed it's nominal maximum power level due to the cell issuing too many power turn-up commands. The radiotelephone limits the power output even when the cell erroneously decides the radiotelephone power should be increased.

We claim:

1. A method for limiting transmit power of a radio operating in a radio communications system, the radio communications system comprising at least one base station that transmits signals including power control commands to the radio, the radio comprising a variable gain amplifier and a maximum gain setting, the method comprising the steps of:

determining an open loop power control value in response to a signal received from the at least one base station;

determining a gain adjust signal in response to the transmitted power control commands;

combining the open loop power control value and the gain adjust signal to produce a summation signal;

comparing the summation signal to the maximum gain setting;

if the summation signal is greater than or equal to the maximum gain setting, adjusting the variable gain amplifier in response to the maximum gain setting; and if the summation signal is less than the maximum gain setting, adjusting the variable gain amplifier in response to the summation signal.

2. The method of claim 1 and further including the step of adjusting the maximum gain setting in response to a temperature of the variable gain amplifier.

3. The method of claim 2 wherein the step of adjusting the maximum gain setting further includes the steps of:

the variable gain amplifier transmitting a signal;

detecting a power value of the transmitted signal;

scaling the power value to produce a scaled power signal;

subtracting the maximum gain setting from the scaled power signal to produce a difference signal; and adding the difference signal to the maximum gain setting.

4. A method for limiting transmit power of a radio operating in a cellular environment, the cellular environment comprising a plurality of cells that transmit power control commands to the radio, the radio comprising a variable gain amplifier and a maximum gain setting, the method comprising the steps of:

determining an open loop power control value in response to a signal received from at least one cell of the plurality of cells;

determining a gain adjust signal in response to the transmitted power control commands;

combining the open loop power control value and the gain adjust signal to produce a summation signal;

adjusting the maximum gain setting in response to a temperature of the variable gain amplifier;

comparing the adjusted maximum gain setting to the summation signal;

if the summation signal is greater than or equal to the adjusted maximum gain setting, prohibiting the gain adjust signal from increasing in response to the transmitted power control commands;

if the summation signal is greater than or equal to the adjusted maximum gain setting, adjusting the variable gain amplifier in response to the adjusted maximum gain setting; and if the summation signal is less than the adjusted maximum gain setting, adjusting the variable gain amplifier in response to the summation signal.

5. A method for limiting transmit power of a radio operating in a cellular environment, the cellular environment comprising a plurality of cells that transmit power control commands to the radio, the radio comprising a variable gain amplifier, a maximum gain setting, and a power limiting accumulator, the method comprising the steps of:

the variable gain amplifier transmitting a signal;

determining a gain adjust signal in response to the transmitted power control commands;

detecting a power value of the transmitted signal;

digitizing the power value;

comparing the digitized power value to the maximum gain setting;

if the digitized power value is greater than the maximum gain setting, decreasing the gain of the variable gain amplifier; and if the digitized power value is greater than the maximum gain setting, prohibiting the gain adjust signal from increasing in response to the transmitted power control commands.

6. A method for limiting transmit power of a radio operating in a cellular environment, the cellular environment comprising a plurality of cells that transmit power control commands to the radio, the radio comprising a variable gain amplifier, a maximum gain setting, and a power control command accumulator that generates a gain adjust signal, the method comprising the steps of:

the variable gain amplifier transmitting a signal;

determining the gain adjust signal in response to the transmitted power control commands;

detecting a power value of the transmitted signal;

digitizing the power value;

comparing the digitized power value to the maximum gain setting;

if the digitized power value is greater than the maximum gain setting, decreasing the gain adjust signal by a predetermined amount for every predetermined unit of time until the gain adjust signal is less than the maximum gain setting; and if the digitized power value is less than or equal to the maximum gain setting, varying the gain of the variable gain amplifier in response to the gain adjust signal.

7. A method for limiting transmit power of a radio operating in a cellular environment, the cellular environment comprising a plurality of cells that transmit power control commands to the radio, the radio comprising a variable gain amplifier, a maximum gain setting, and a power limiting accumulator, the method comprising the steps of:

the variable gain amplifier transmitting a signal;

determining a gain adjust signal in response to the transmitted power control commands;

detecting a power value of the transmitted signal;

digitizing the power value;

determining a difference between the digitized power value and the maximum gain setting;

integrating the difference to generate a gain control signal, the gain control signal being limited to a predetermined range;

adjusting the variable gain amplifier with the gain control signal; and if the gain control signal is less than a predetermined value, prohibiting the gain adjust signal from increasing the variable gain amplifier in response to the transmitted power control commands.

* * * * *

(12) EX PARTE REEXAMINATION CERTIFICATE (6339th)
United States Patent
Weiland et al.

(10) Number: US 5,590,408 C1
(45) Certificate Issued: Aug. 5, 2008

(54) RADIO TELEPHONE USING RECEIVED SIGNAL STRENGTH IN CONTROLLING TRANSMISSION POWER

(75) Inventors: Ana L. Weiland, Encinitas, CA (US); Richard K. Kornfeld, San Diego, CA (US); John E. Maloney, San Diego, CA (US)

(73) Assignee: QUALCOMM Incorporated, San Diego, CA (US)

Reexamination Request:
No. 90/008,496, Feb. 15, 2007

Reexamination Certificate for:
Patent No.: 5,590,408
Issued: Dec. 31, 1996
Appl. No.: 08/407,543
Filed: Mar. 20, 1995

Related U.S. Application Data

(62) Division of application No. 08/203,151, filed on Feb. 28, 1994, now Pat. No. 5,452,473.

(51) Int. Cl.
*H04B 7/005* (2006.01)

(52) U.S. Cl. ............. 455/69; 455/115.1; 455/116; 455/126; 455/127.2

(58) Field of Classification Search .............. None
See application file for complete search history.

(56) References Cited

U.S. PATENT DOCUMENTS

| 5,107,487 A | 4/1992 | Vilmur et al. |
| 5,129,098 A | 7/1992 | McGirr et al. |
| 5,241,690 A | 8/1993 | Larsson et al. |

*Primary Examiner*—Charles R. Craver

(57) ABSTRACT

The process and apparatus of the present invention limits the output power of a radiotelephone, operating in a cellular system in the preferred embodiment. This ensures the transmitted sidebands and synthesizer phase noise remains within a certain specification. This is accomplished by power detection and a correction accumulator that together generate a gain control signal by limiting the gain adjustment to a maximum value, even when the cell site communicating with the radiotelephone is sending power turn-up commands to the radiotelephone. This process includes dynamically correcting the output level of the transmitter due to gain variations in the transmitter stages or gain control elements.

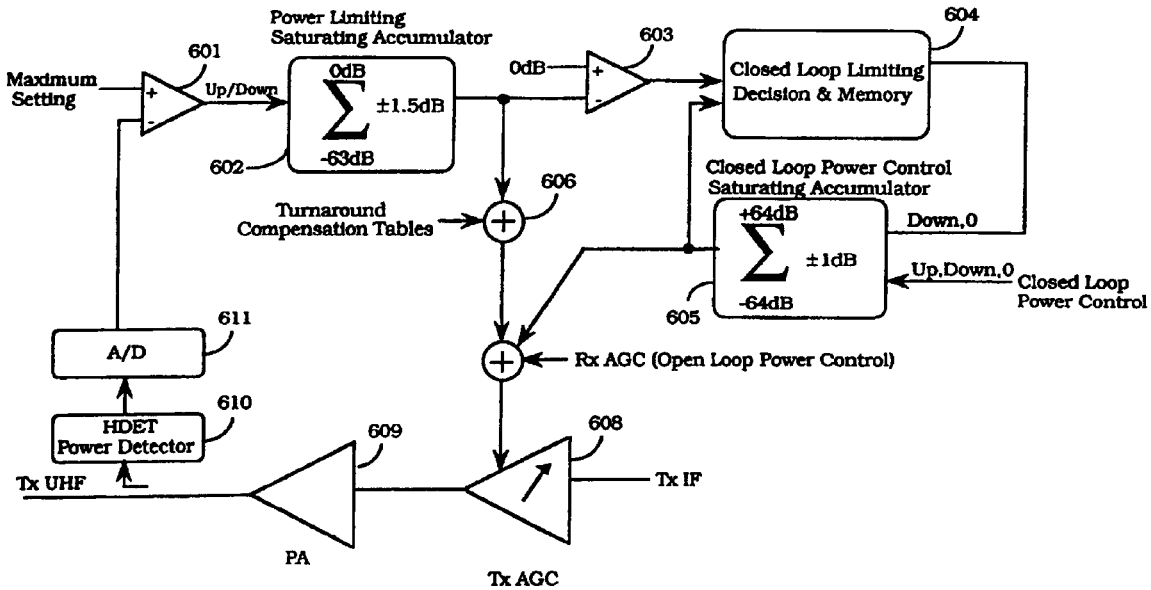

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *